United States Patent
Lenz et al.

(10) Patent No.: US 9,316,267 B2
(45) Date of Patent: Apr. 19, 2016

(54) UNIVERSAL JOINT ASSEMBLY

(71) Applicant: Airbus Operations GmbH, Hamburg (DE)

(72) Inventors: Florian Lenz, Dresden (DE); Samuel Rufo Gonzalez, Bremen (DE); Mathias Kliem, Dresden (DE); Werner Hufenbach, Dresden (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 14/336,010

(22) Filed: Jul. 21, 2014

(65) Prior Publication Data

US 2015/0031463 A1  Jan. 29, 2015

(30) Foreign Application Priority Data

Jul. 23, 2013 (EP) .................................... 13177564

(51) Int. Cl.
| | |
|---|---|
| *F16D 3/00* | (2006.01) |
| *F16D 3/32* | (2006.01) |
| *F16D 3/16* | (2006.01) |
| *F16D 3/38* | (2006.01) |

(52) U.S. Cl.
CPC .. *F16D 3/32* (2013.01); *F16D 3/16* (2013.01); *F16D 3/38* (2013.01)

(58) Field of Classification Search
CPC ................ F16D 3/38; F16D 3/32; F16D 3/16
USPC ................................................. 464/112, 125
See application file for complete search history.

(56) References Cited

U.S. PATENT DOCUMENTS

| | | | |
|---|---|---|---|
| 1,790,677 A | 2/1931 | Place | |
| 3,300,258 A | 1/1967 | Kompanek et al. | |
| 5,569,089 A * | 10/1996 | Signorelli | F16D 3/30 464/112 |
| 6,115,863 A * | 9/2000 | Mason | D06F 13/08 68/131 |
| 2003/0102657 A1* | 6/2003 | Kuo | B62H 1/12 280/755 |
| 2014/0224545 A1* | 8/2014 | Nicol-Seto | E21B 17/03 175/107 |

FOREIGN PATENT DOCUMENTS

| | | |
|---|---|---|
| CH | 348 582 A | 8/1960 |
| FR | 2 568 329 A1 | 1/1986 |
| GB | 2 361 983 A | 11/2001 |
| WO | 2009/015425 A1 | 2/2009 |

OTHER PUBLICATIONS

European Search Report (EP 13 177 564.5)(Sep. 5, 2013).

* cited by examiner

*Primary Examiner* — Kanjibhai Patel
(74) *Attorney, Agent, or Firm* — Lerner, David, Littenberg, Krumholz & Mentlik, LLP

(57) ABSTRACT

A universal joint member for transmitting torque between two shafts of a drive mechanism includes a first pivot axis for pivoting connection to a first shaft of the drive mechanism, wherein the first pivot axis extends substantially perpendicular to a rotational axis of the first shaft; and a second pivot axis for pivoting connection to a second shaft of the drive mechanism, the second pivot axis extending substantially perpendicular to the first pivot axis and substantially perpendicular to a rotational axis of the second shaft. A cavity extends through the universal joint member for receiving a pivot pin along the second pivot axis, wherein the pivot pin is configured to connect the universal joint member to the second shaft. A universal joint assembly for a drive mechanism includes a first rotatable shaft, a second rotatable shaft, and a universal joint member for transmitting torque between the first and second shafts.

15 Claims, 3 Drawing Sheets

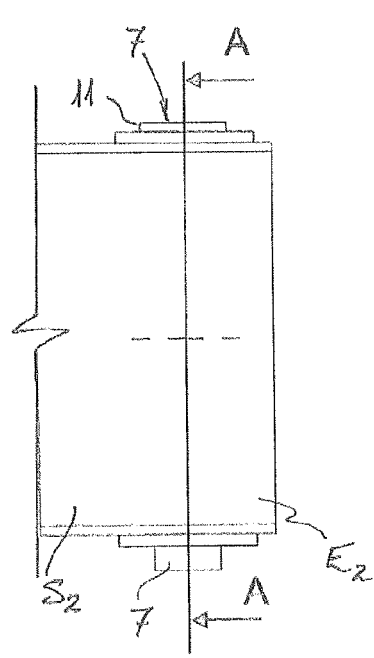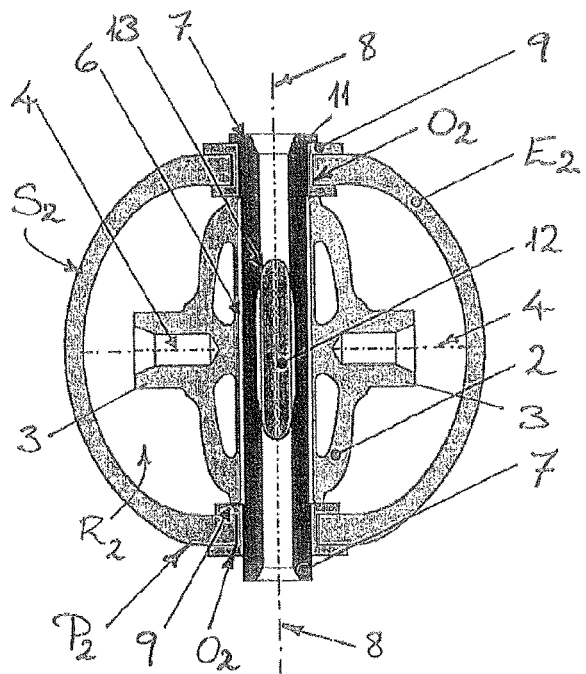
Fig. 3a  Fig. 3b
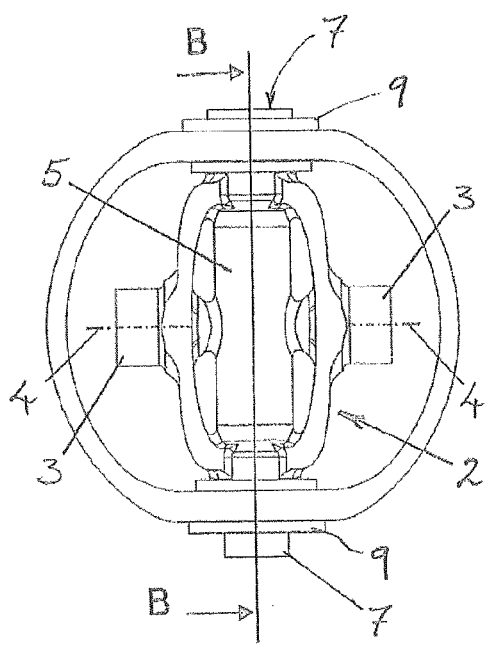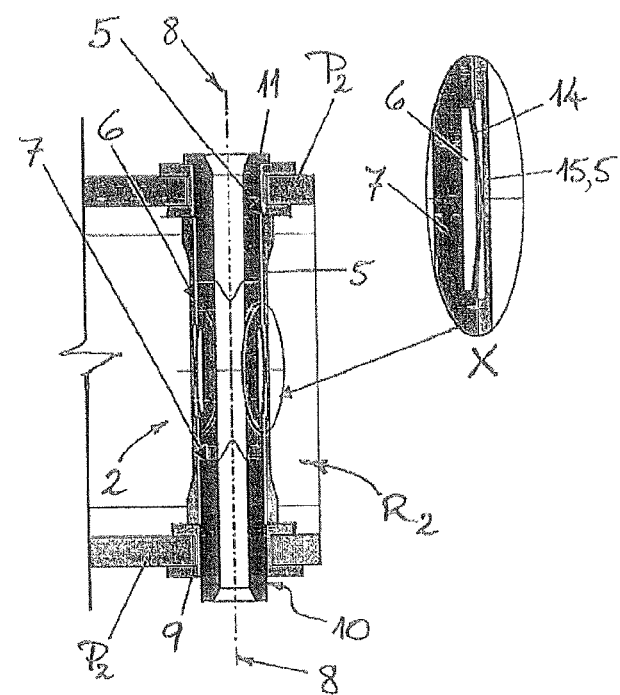
Fig. 4a  Fig. 4b

UNIVERSAL JOINT ASSEMBLY

FIELD OF THE INVENTION

The present invention relates to a universal joint member for torque transmission between two shafts in a drive mechanism, especially in a vehicle, such as an aircraft or spacecraft. The invention also provides a universal joint assembly for a drive mechanism, and to a vehicle, especially an aircraft or spacecraft, having at least one drive mechanism incorporating such a universal joint assembly.

BACKGROUND OF THE INVENTION

Universal joints, or "Cardan" joints as they are also known, are typically employed in drive mechanisms for transferring or transmitting torque from a first shaft (e.g. input shaft) to a second shaft (e.g. output shaft), in particular where the rotational axis of the two shafts are to be disposed or pitched at an angle to one another (i.e. non-parallel shaft axes). In aeronautical applications, especially in the drive mechanisms or drive units of aircraft and spacecraft, the assembly of such universal joints or Cardan joints is often required to be performed in very narrow spaces, where the use of tools for performing the assembly is often impractical. In view of known or conventional universal joint configurations that need to be pre-assembled on a workbench, therefore, a simple, unambiguous and relatively fast in situ assembly of the components of such a joint is highly desirable. In addition, such joints should permit straight-forward visual inspection and verification of the integrity of the joint during any maintenance operations. Furthermore, as composite materials, and especially fibre-reinforced polymer composite materials such as CFRP, are gaining increased usage within the aeronautical industry, new designs for universal joints or Cardan joints should be suitable for application with shafts comprised of different materials and/or of different diameters.

BRIEF SUMMARY OF THE INVENTION

It is an idea of the present invention to provide a new and improved universal joint assembly for addressing one or more of the issues discussed above. More particularly, it would be desirable to provide a universal joint assembly which is quick and easy to install in situ, especially in cramped or confined spaces where tools are difficult to employ. It would also be desirable to provide a universal joint assembly that is suitable or designed for drive units or drive mechanisms that employ light-weight composite materials, such as carbon fibre reinforced polymer materials.

According to one aspect, therefore, the invention provides a universal joint member for transmitting torque between two shafts of a drive mechanism, the joint member comprising:

- a first pivot axis for pivoting connection to a first shaft of the drive mechanism, the first pivot axis extending substantially perpendicular to a rotational axis of the first shaft; and
- a second pivot axis for pivoting connection to a second shaft of the drive mechanism, the second pivot axis extending substantially perpendicular to the first pivot axis and also extending substantially perpendicular to a rotational axis of the second shaft;
- wherein a cavity is provided through the universal joint member for receiving a pivot pin along the second pivot axis, wherein the pivot pin is configured to connect the universal joint member to the second shaft.

In an embodiment, the cavity is designed to receive the pivot pin via an axial insertion through the joint member for non-threaded connection to the second shaft. The pivot pin is preferably also removable by axial withdrawal, though the pivot pin may also be axially fastened; e.g. releasably axially fastened in the cavity by means of a fastener, such as a clip or circlip. In this way, the universal joint member of the invention is particularly adapted for applications where little assembly space is available and thus, where the use of hand-tools may be highly constrained and therefore not feasible in practice.

In another embodiment, the cavity through the joint member is elongate and is arranged to extend across or to intersect the rotational axis of the second shaft. Furthermore, the cavity preferably extends essentially fully through the universal joint member, i.e. across a full width or diameter of the universal joint member. In this regard, the cavity may comprise a through hole, such as a bore or a channel, and may be formed by a sleeve, e.g. a cylindrical sleeve, with the through hole preferably positioned substantially centrally in the joint member. Because the pivot pin inserted into the cavity is configured to connect the universal joint member to the second shaft, the pivot pin preferably spans a width or diameter of the second shaft within the cavity. Furthermore, the pivot pin is preferably configured to project from opposite ends of the elongate bore or cavity, such that the integrity of the universal joint can be readily confirmed by visual inspection; i.e. the ends of the pivot pin are visible at opposite ends of the cavity.

In another embodiment, the cavity includes catch means for engagement with the pivot pin, such that the pivot pin is configured to be non-rotatably fixed (i.e. non-pivotally fixed) about the second axis within the cavity with respect to the joint member. For example, the catch means may include a recess, such as a slot, notch, elongate hole, or shoulder, designed to engage with a corresponding projection or protrusion on the pivot pin. The pivot pin may include an insert, such as a plug element, to activate an interaction or engagement between the projection or protrusion on the pivot pin and the catch means in the cavity. That is, insertion of the plug element may activate or effect a locking interaction or engagement between the pivot pin and the cavity.

In another embodiment, the universal joint member further comprises such a pivot pin to be received within the cavity along the second pivot axis. The pivot pin may be designed for a form-fit within the cavity provided in the joint member and is preferably configured to pivot about the second pivot axis with respect to the second shaft. Preferably, the pivot pin includes a head portion at one end thereof for seating against an abutment surface of the second shaft. A length of the pivot pin may be substantially greater than a length the cavity such that the other end of the pivot pin can project beyond the second shaft diametrically opposite the head portion. This other end of the pivot pin may include fastening means, such as a clip, for releasably retaining the pivot pin in the cavity. In view of an optional form-fit within the cavity, however, it will be appreciated that a fastening means at the distal or other end of the pivot pin may not be absolutely necessary.

In another embodiment, the first pivot axis is formed by a pair of stub axles. The stub axles extend outwards from the joint member on laterally opposite sides of the cavity, and provide pivots for a pivoting connection of the first shaft about the first pivot axis.

According to another aspect, the present invention provides a universal joint assembly of a drive unit or drive mechanism, the joint assembly comprising:

- a first rotatable shaft;

a second rotatable shaft; and
a universal joint member to transmit torque between the first and second shafts, the joint member comprising: a first pivot connection to the first shaft about a first pivot axis, the first pivot axis extending substantially perpendicular to a rotational axis of the first shaft; and a second pivot connection to the second shaft about a second pivot axis, the second pivot axis extending substantially perpendicular to the first pivot axis and substantially perpendicular to a rotational axis of the second shaft;
wherein the second pivot connection includes a pivot pin that connects the universal joint member to the second shaft, the pivot pin provided within a cavity extending through the universal joint member along the second pivot axis.

In an embodiment, the first shaft of the universal joint assembly includes first attachment means at an end region thereof for attachment with the universal joint member in the first pivot connection. Similarly, the second shaft of the joint assembly includes second attachment means at an end region thereof for attachment with the universal joint member in the second pivot connection. In this regard, the second attachment means may include a recess formed or provided at an end region of the second shaft to accommodate the universal joint member. The second attachment means may further include flanks, i.e. side portions, of the second shaft adjacent or about the recess (e.g. at opposite sides thereof) which are configured to receive the pivot pin, preferably in a non-threaded, axially inserted pivot connection. In this way, the universal joint member can be mounted to the second shaft directly and intermediate mounting elements, such as flange connections, can thereby be avoided. This, in turn, may save weight and enhance joint reliability by reducing the number of attachment or connection interfaces.

In another embodiment, the second attachment means includes a pivot bearing, such as a bushing, provided in or at each of the opposite flanks, i.e. side portions, of the second shaft for receiving and pivotally supporting the pivot pin when it is inserted through the cavity of the universal joint member. In this way, the pivot pin preferably extends through each pivot bearing.

In another embodiment, the pivot pin is configured for removable axial insertion into the cavity through the joint member for non-threaded connection to the second shaft. As noted above, the universal joint member is thus particularly adapted for use in applications where little assembly space is available and, thus, where the use of hand-tools is highly constrained and/or not feasible. In a particularly preferred embodiment, the pivot pin of the second pivot connection extends fully through or across a full width or diameter of the universal joint member and intersects the rotational axis of the second shaft. Furthermore, the pivot pin may extend substantially across a full width or diameter of the second shaft.

In another embodiment, the pivot pin may be configured to pivot about the second pivot axis with respect to the second shaft. The pivot pin is preferably non-rotatably fixed in the cavity against pivoting about the second axis with respect to the universal joint member. In this regard, the pivot pin may include one or more engaging means, such as a projection or protrusion, to engage with the cavity, so that the pivot pin is configured to be non-rotatably (i.e. non-pivotally) fixed about the second axis within the cavity with respect to the joint member. For example, the cavity may include catch means in the form of one or more slot, notch, elongate hole, or shoulder, designed to engage with a corresponding projection or protrusion on the pivot pin. As noted above, the cavity is preferably formed or defined by an elongate bore in a sleeve which extends through the universal joint member, e.g. a cylindrical sleeve, and desirably located substantially centrally in the joint member.

In another embodiment, the first pivot connection of the universal joint member includes a pair of stub axles extending outwards in laterally opposite directions with respect to the cavity. The stub axles may thus be pivotally connected with the first shaft and thereby define the first pivot axis. In this regard, the first shaft of the universal joint assembly includes the first attachment portion at an axial end region thereof and desirably includes a recess for accommodating at least part of the universal joint member. The first attachment means may also include flanks, i.e. side portions, of the first shaft adjacent or about the recess (e.g. at opposite sides thereof) which are configured to receive the stub axles in a non-threaded, axially inserted pivot connection.

With regard to operation of the universal joint assembly of the invention (e.g. in a drive unit or drive mechanism), it will be understood that the first shaft of the joint assembly may operate as an input shaft, i.e. a driving shaft, while the second shaft of the joint assembly may form an output shaft, i.e. a driven shaft. Equally, however, it will be appreciated that this configuration may be reversed, such that the second shaft of the joint assembly may be the input shaft, while the first shaft of the assembly forms the output shaft of the assembly.

According to a further aspect, the present invention provides a drive mechanism for a vehicle, especially an aircraft or a spacecraft, wherein the drive mechanism includes a universal joint assembly according to any one of the embodiments of the invention described above.

BRIEF DESCRIPTION OF THE DRAWINGS

For a more complete understanding of the present invention and the advantages thereof, exemplary embodiments of the invention are explained in more detail in the following description with reference to the accompanying drawings, in which like reference characters designate like parts and in which:

FIG. 3a is a side view of the joint assembly in FIG. 2;

FIG. 3b is a cross-sectional view of the joint assembly in FIG. 3a taken in the direction of arrows A-A;

FIG. 4a is an end view of the joint assembly in FIG. 2;

FIG. 4b is a cross-sectional view of the joint assembly in FIG. 4a taken in the direction of arrows B-B;

The accompanying drawings are included to provide a further understanding of the present invention and are incorporated in and constitute a part of this specification. The drawings illustrate particular embodiments of the invention and together with the description serve to explain the principles of the invention. Other embodiments of the invention and many of the attendant advantages of the invention will be readily appreciated as they become better understood with reference to the following detailed description.

It will be appreciated that common and well understood elements that may be useful or necessary in a commercially feasible embodiment are not necessarily depicted in order to facilitate a more abstracted view of the embodiments. The elements of the drawings are not necessarily illustrated to scale relative to each other. It will further be appreciated that certain actions and/or steps in an embodiment of a method may be described or depicted in a particular order of occurrences while those skilled in the art will understand that such specificity with respect to sequence is not necessarily required. It will also be understood that the terms and expressions used in the present specification have the ordinary meaning as is accorded to such terms and expressions with respect to their corresponding respective areas of inquiry and study, except where specific meanings have otherwise been set forth herein.

DETAILED DESCRIPTION

Figure 1:
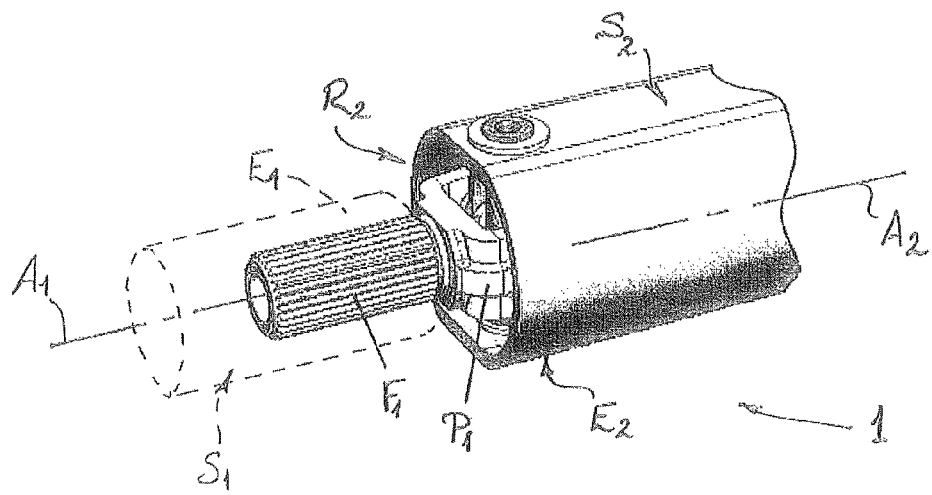
FIG. 1 is a perspective view of a universal joint assembly according to an embodiment of the invention.
Figure 2:
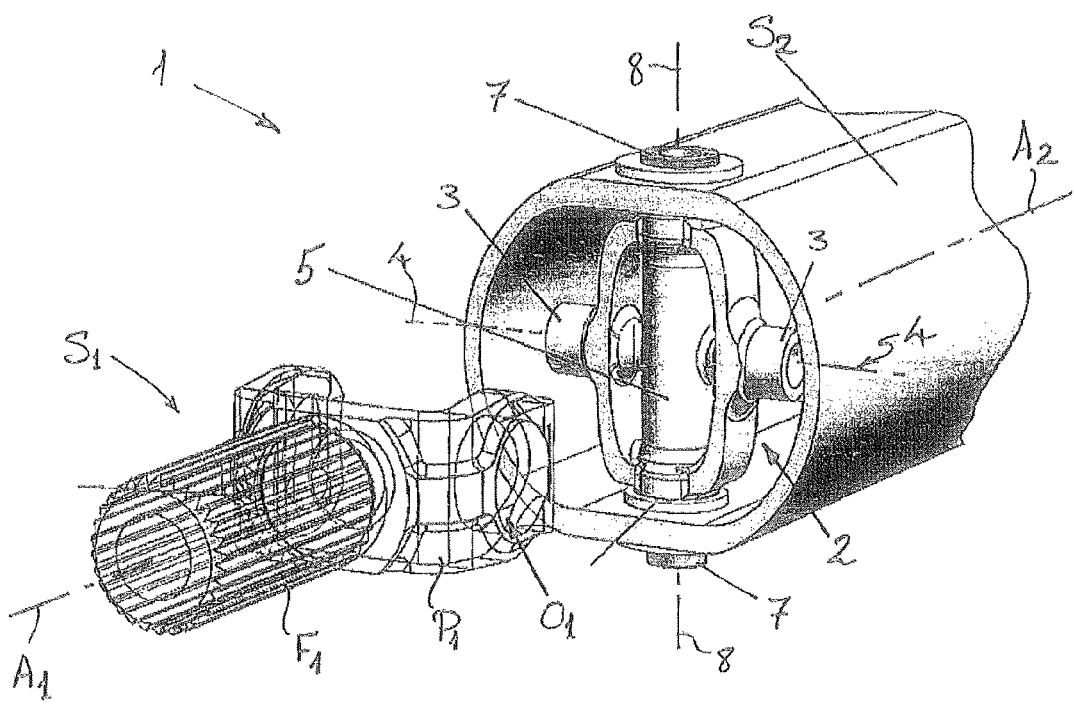
FIG. 2 is another perspective view of the universal joint assembly shown in FIG. 1.

With reference firstly to FIGS. 1 and 2 of the drawings, a universal joint assembly 1 according to an embodiment of the invention is illustrated as part of a drive unit or drive mechanism. The assembly 1 includes a first shaft $S_1$ having a rotational axis $A_1$ which is connected by a universal joint member 2 to a second shaft $S_2$ having a rotational axis $A_2$. The first shaft $S_1$ forms an input shaft and transmits torque via the joint member 2 to the second shaft $S_2$, which in this instance then forms an output shaft for further transmitting the torque imparted to it from the first shaft $S_1$. That is, the first shaft $S_1$ may be a metal alloy drive shaft (e.g. of steel) of a motor in the drive mechanism. The second shaft $S_2$, on the other hand, may be a fibre-reinforced polymer output shaft (e.g. of CFRP). It will be appreciated, however, that the torque input and torque output may be reversed without any significant impact or effect on the configuration of the universal joint assembly 1.

As seen in drawing FIGS. 1 and 2, a distal end region $E_1$ of the first shaft $S_1$ includes a splined fitting $F_1$, which is non-rotatably (i.e. substantially rigidly) embedded centrally and axially aligned in the first shaft $S_1$. The fitting $F_1$ has a forked attachment means $P_1$ including a pair of laterally opposed apertures $O_1$ that form pivot bearings for pivotal connection to the universal joint member 2, as will be described shortly. The second shaft $S_2$, on the other hand, has a hollow end region $E_2$ defining a recess $R_2$ for accommodating the universal joint member 2, and the side portions $P_2$ of the end region $E_2$ form part of the means for attaching the universal joint member 2 to the second shaft $S_2$.

With reference also now to FIGS. 3a and 3b and to FIGS. 4a and 4b of the drawings, the universal joint member 2 includes two circular stub axles 3, i.e. stub shafts, which extend laterally outwards on opposite sides of the joint member 2. The stub axles 3 define a first pivot axis 4 and form a first pivot connection with the first shaft $S_1$ via the apertures, which may be formed as openings $O_1$, in the forked attachment portion $P_1$ of the splined fitting $F_1$. That is, the apertures $O_1$ respectively receive one of the stub axles 3 in the first pivoting connection, with the first pivot axis 4 extending substantially perpendicular to the rotational and longitudinal axis $A_1$ of the first shaft.

The universal joint member 2 furthermore includes a central cylindrical channel or sleeve 5 which defines a cavity 6 extending through the universal joint member 2 for receiving a pivot pin 7, which in this case is in the form of a hollow cylindrical bolt. The pivot pin 7 is axially inserted through the cavity 6 in the cylindrical sleeve or channel 5, which defines a second pivot axis 8 substantially perpendicular to the first pivot axis 4 and substantially perpendicular to the rotational axis $A_2$ of the second shaft $S_2$.

As is particularly apparent from FIGS. 2, 3b and FIG. 4a, the universal joint member 2 is accommodated within the hollow end region $E_2$ of the second shaft $S_2$. As already noted above, this hollow end region $E_2$ includes side portions, i.e. flanks, $P_2$ for attaching the joint member 2 to the second shaft $S_2$. Specifically, the side portions $P_2$ include apertures, which may be formed as openings $O_2$, which are configured for alignment with the cylindrical sleeve 5 and cavity 6 through which the pivot pin 7 is inserted. Each of the apertures $O_2$ includes a bearing, which may be formed as bushing or grommet 9, which preferably seals around an outer circumference 10 of the pivot pin 7. The pivot pin 7 also incorporates a head 11 at one end thereof for bearing against the respective bearing, for example a bushing or grommet 9, at the side portions $P_2$.

As can be seen in FIG. 3b, the hollow pivot pin 7 may include an insert component, such as a plug 12, to fill or block a central bore 13 of that pivot pin 7 and also generate a form-fitting interaction with the universal joint member 2 to prevent the pivot pin 7 from rotating with respect to the joint member 2 about the second pivot axis 8. This aspect of the joint assembly 1 in this particular embodiment is illustrated in FIG. 4b, which shows a detail X of the interaction between the pivot pin 7 and a part of the sleeve 5 and cavity 6 through which that pivot pin 7 is inserted. In this regard, the pivot pin 7 may include projection elements 14, here in the form of resilient strips or bands, which are configured to project or protrude radially outwards upon insertion of the plug 12 into the bore of the pivot pin formed as bolt 7, and to engage corresponding or complementary slots, grooves or notches 15 in the sides of the cavity 6. By virtue of this interaction or inter-engagement, the pivot pin 7 is non-rotatably or non-pivotally received within the cavity 6 of the universal joint member 2 with respect to the second pivot axis 8. It will be appreciated, however, that the pivot pin 7 may nevertheless still pivot together with the joint member 2 about the second pivot axis 8. The insert or plug 12 is preferably of a relatively soft or resilient material, such as plastic, and preferably seals the central bore 13 of the pivot pin 7 against dust and grit.

It will be noted that the universal joint member 2 of the present invention will typically be subjected to substantial loads in use and is therefore preferably formed of a strong, robust, and highly durable material, such as a metal alloy, with steel being particularly preferred. Similarly, the pivot pin 7 is typically also subjected to substantial loads and is thus desirably also formed of a robust and durable material, e.g. preferably a metal alloy, such as steel.

Figure 5:
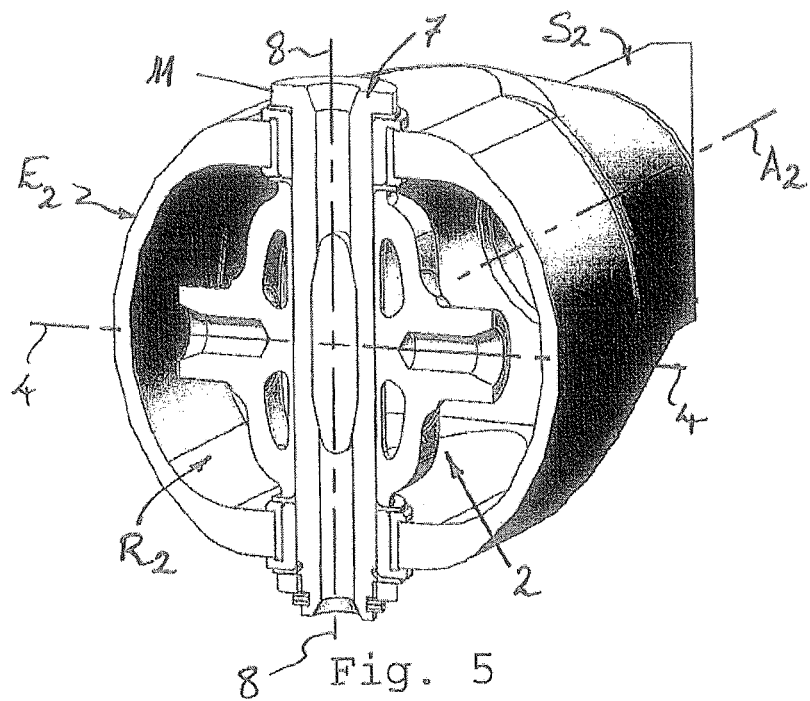
FIG. 5 is a cross-sectional perspective view of the Cardan joint or universal joint assembly according to an embodiment of the invention.
Figure 6:
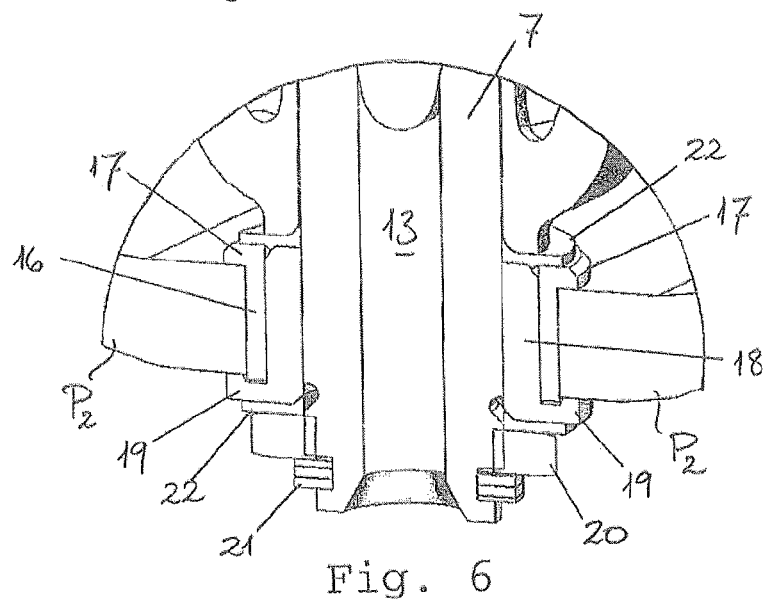
FIG. 6 is a detail view of the joint assembly in FIG. 5.

With reference now to FIG. 5 and FIG. 6 of the drawings, an alternative embodiment of a universal joint assembly 1 of the invention is illustrated, in which the distal end region $E_2$ of the second shaft $S_2$ is flared or enlarged to provide a sufficiently sized recess $R_2$ and/or hollow attachment means $P_2$ for housing and mounting the universal joint member 2. The universal joint member 2 itself and the pivot pin arrangement for mounting the joint member 2 remain essentially the same as that shown in FIGS. 1 to 4b of the drawings. With regard to FIG. 6, however, additional detail of a preferred pivot mounting is illustrated. In this regard, it will be seen that the arrangement of the sealing bearing 9 provided in the apertures $O_2$ in the side portions $P_2$ of the second shaft $S_2$ at opposite ends of the pivot pin 7 may comprise multiple parts, including an outer bushing 16 with a shoulder, for example a flange 17, seated on an inner side of the side portions $P_2$ of the second shaft $S_2$, an inner bushing 18 with a shoulder, for example a flange 19, seated on an outer side of the side portions $P_2$ and a security nut 20 and/or a circlip 21 for fastening the bolt 7 against axial removal. A sealing washer 22 may also be provided between the joint member 2 and the bushings 16, 18 and/or between the bushings 16, 18 and the securing nut 20 or circlip 21.

Figure 7:
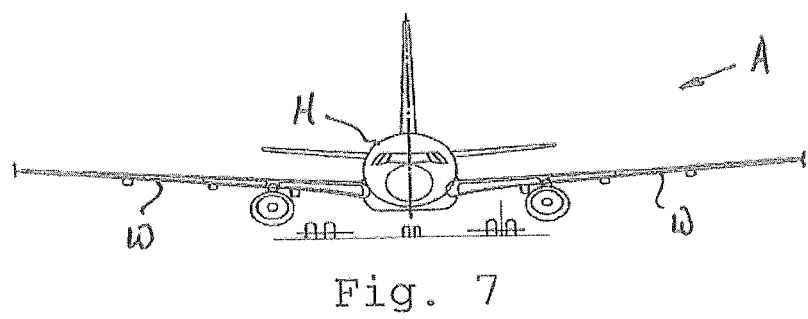
FIG. 7 is a schematic illustration of an aircraft in which a universal joint according to an embodiment of the invention is employed.

Finally, FIG. 7 of the drawings illustrates an aircraft A having a hull or fuselage structure H and wings W, in which a universal joint assembly 1 of the invention may, for example, find application. The wings W typically incorporate a number of drive mechanisms for operating wing flaps at the trailing edge of the wings and/or ailerons or other control surfaces. Thus, the aircraft A, and especially the wings W, may include one or a plurality of drive mechanisms (not shown) having the universal joint assembly 1 of the invention described above.

Although specific embodiments of the invention have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In this document, the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

The invention claimed is:

1. A universal joint member for transmitting torque between first and second shafts of a drive mechanism, the joint member comprising:
a first pivot axis for pivoting connection to the first shaft of the drive mechanism, whereby the first pivot axis extends substantially perpendicular to a rotational axis of the first shaft; and
a second pivot axis for pivoting connection to the second shaft of the drive mechanism, whereby the second pivot axis extends substantially perpendicular to the first pivot axis and substantially perpendicular to a rotational axis of the second shaft,
wherein a cavity extends through the universal joint member for receiving a pivot pin along the second pivot axis, and
wherein the pivot pin is configured to connect the universal joint member to the second shaft.

2. The universal joint member according to claim 1, wherein the cavity through the joint member extends across the rotational axis of the second shaft, and extends substantially fully through the universal joint member.

3. The universal joint member according to claim 1, wherein the cavity is formed by a sleeve, such as a cylindrical sleeve, and is located substantially centrally in the joint member.

4. The universal joint member according to claim 1, wherein the first pivot axis is formed by first and second stub axles extending laterally outwards with respect to the cavity in opposite directions.

5. The universal joint member according to claim 1, wherein the cavity includes catch means for engagement with complementary engaging means provided on the pivot pin, wherein the pivot pin is configured to be non-rotatably fixed in the cavity with respect to the joint member.

6. The universal joint member according to claim 1, comprising a pivot pin to be received within the cavity along the second pivot axis, wherein the pivot pin is unthreaded and configured to pivot about the second pivot axis with respect to the second shaft.

7. A universal joint assembly for a drive mechanism, the joint assembly comprising:
a first rotatable shaft;
a second rotatable shaft; and
a universal joint member configured to transmit torque between the first and second shafts, the universal joint member comprising:
a first pivot axis pivotally connected to the first shaft, the first pivot axis extending essentially perpendicular to a rotational axis of the first shaft; and
a second pivot axis pivotally connected to the second shaft, the second pivot axis extending essentially perpendicular to the first pivot axis and essentially perpendicular to a rotational axis of the second shaft;
wherein a pivot pin connects the joint member to the second shaft, the pivot pin provided within a cavity that extends through the universal joint member along the second pivot axis.

8. The universal joint assembly according to claim 7, wherein the second shaft comprises a hollow end region, and wherein the universal joint member is accommodated in the hollow end region in pivotal connection with the second shaft.

9. The universal joint assembly according to claim 7, wherein the second shaft includes a bearing, provided at opposite sides thereof to receive and support the pivot pin inserted through the cavity, whereby the pivot pin extends through each bearing.

10. The universal joint assembly according to claim 7, wherein the pivot pin is non-rotatably fixed in the cavity with respect to the universal joint member, and/or wherein the pivot pint extends across the rotational axis of the second shaft and substantially fully through the universal joint member.

11. The universal joint assembly according to claim 7, wherein the cavity is formed by a channel and is substantially centrally located in the joint member.

12. The universal joint assembly according to claim 7, wherein the universal joint member includes a pair of stub axles extending outwards of the cavity in laterally opposite directions, the stub axles defining the first pivot axis and being in a pivotal connection with the first shaft.

13. The universal joint assembly according to claim 7, wherein the pivot pin is configured to engage with catch means in the cavity, such that the pivot pin is configured to be non-rotatably fixed in the cavity about the second pivot axis with respect to the joint member.

14. A drive mechanism for a vehicle, wherein the drive mechanism includes a universal joint assembly, the joint assembly comprising:

a first rotatable shaft;
a second rotatable shaft; and
a universal joint member which transmits torque between the first and second shafts, the universal joint member comprising:
a first pivot axis pivotally connected to the first shaft, the first pivot axis extending essentially perpendicular to a rotational axis of the first shaft; and
a second pivot axis pivotally connected to the second shaft, the second pivot axis extending essentially perpendicular to the first pivot axis and essentially perpendicular to a rotational axis of the second shaft,
wherein a pivot pin connects the joint member to the second shaft, the pivot pin provided within a cavity that extends through the universal joint member along the second pivot axis.

15. The universal joint assembly according to claim 11, wherein the cavity is formed by a cylindrical channel.

\* \* \* \* \*